United States Patent
Kang et al.

(10) Patent No.: US 11,486,279 B2
(45) Date of Patent: Nov. 1, 2022

(54) OIL DRAIN PLUG APPARATUS

(71) Applicant: INZICONTROLS CO., LTD., Siheung-si (KR)

(72) Inventors: Seong Min Kang, Anyang-si (KR); Seon Yeong Jung, Siheung-si (KR); Eun Sek Choi, Ansan-si (KR); Kwang Ho Oh, Siheung-si (KR)

(73) Assignee: INZICONTROLS CO., LTD., Siheung-si (KR)

( * ) Notice: Subject to any disclaimer, the term of this patent is extended or adjusted under 35 U.S.C. 154(b) by 0 days.

(21) Appl. No.: 17/145,826

(22) Filed: Jan. 11, 2021

(65) Prior Publication Data
US 2021/0254517 A1   Aug. 19, 2021

(30) Foreign Application Priority Data
Feb. 19, 2020   (KR) .................... 10-2020-0020131

(51) Int. Cl.
*F01M 11/04* (2006.01)
*F16H 57/04* (2010.01)

(52) U.S. Cl.
CPC ..... *F01M 11/0408* (2013.01); *F16H 57/0408* (2013.01); *F01M 2011/0416* (2013.01)

(58) Field of Classification Search
CPC ....... F01M 11/0408; F01M 2011/0416; F01M 2011/0062; F16H 57/0408
See application file for complete search history.

(56) References Cited

U.S. PATENT DOCUMENTS

| | | | | |
|---|---|---|---|---|
| 6,052,896 A | * | 4/2000 | Howell, III | F01M 11/0408 29/888.011 |
| 2011/0011865 A1 | * | 1/2011 | Cook | F01M 11/0004 220/288 |
| 2011/0133415 A1 | * | 6/2011 | Vu | F16J 15/061 277/608 |

FOREIGN PATENT DOCUMENTS

| | | |
|---|---|---|
| KR | 10-1619107 B1 | 5/2016 |
| KR | 10-1839898 B1 | 3/2018 |

* cited by examiner

*Primary Examiner* — Jacob M Amick
*Assistant Examiner* — Charles J Brauch
(74) *Attorney, Agent, or Firm* — Sughrue Mion, PLLC (57) ABSTRACT

Disclosed is an oil drain plug apparatus, wherein the oil drain plug apparatus is mounted on an automobile component containing a fluid including oil, and the oil drain plug apparatus includes a mounting portion provided on the automobile component and having a fastening hole penetrating the mounting portion; a plug portion configured to be inserted into the fastening hole and mounted on the mounting portion; and a sealing portion for sealing a gap between the mounting portion and the plug portion, wherein the sealing portion is mounted on the mounting portion while being coupled to the plug portion, wherein the plug portion includes a plug configured to be inserted into the automobile component through the fastening hole when coupled to the mounting portion; and a cap extending from the plug so as to be exposed to the outside of the automobile component through the fastening hole when coupled to the mounting portion, and the plug portion is rotated after being inserted into the fastening hole, and is fixed to the mounting portion, wherein one or more interference blades configured to protrude from the outer circumferential surface of the cap and bend toward the plug are formed on the cap to limit the rotation angle of the plug portion relative to the mounting

(Continued)

portion. With this configuration, easy assembly may be realized, and maintainability and repairability may be improved.

8 Claims, 5 Drawing Sheets

OIL DRAIN PLUG APPARATUS

CROSS-REFERENCE TO RELATED APPLICATION

This application claims priority to Korean Patent Application No. 10-2020-0020131, filed on Feb. 19, 2020 in the Korean Intellectual Property Office, the disclosure of which is incorporated herein by reference.

BACKGROUND OF THE DISCLOSURE

Field of the Disclosure

The present disclosure relates to an oil drain plug apparatus, and more particularly, to an oil drain plug apparatus that is capable of being easily coupled to and separated from automobile components such as an automatic transmission of an automobile and has improved assembly performance, thereby improving maintainability and repairability.

Description of the Related Art

In general, an automobile is equipped with an automatic transmission (A/T) for automatically changing a transmission ratio according to the output of an engine. An automatic transmission is a device for controlling the power and speed of an automobile by transmitting the output of an engine to wheels in accordance with the driving speed of the automobile.

Oil as a hydraulic fluid circulates inside an automatic transmission. In this case, oil plays a role in power transmission in a torque converter, lubrication of rotation elements such as gears and bearings, cooling of the inside of an automatic transmission by an oil cooler, and shock absorption. In addition, oil is used as a hydraulic fluid for hydraulic devices such as valves, clutches, and hydraulic brakes.

When the amount of oil circulating inside an automatic transmission is too much or too little, the performance of the automatic transmission may be directly affected. Accordingly, it is necessary to continuously maintain a proper amount of oil from the time an automobile is shipped. To check the amount of oil inside an automatic transmission, an oil level gauge for measuring an oil level is installed on one side of the automatic transmission.

In recent years, due to improvement of the quality of automatic transmission oils, a system that does not require replacement of oil once supplied to an automatic transmission has been used. When such a transmission oil that does not require replacement is injected into an automatic transmission, an excess of oil is discharged through an oil drain plug provided on the automatic transmission. Thereby, an appropriate oil level may be maintained.

In addition, to check an oil level, an oil drain plug should be configured to be detachable. Accordingly, the number of assembly steps for separating and assembling an oil drain plug may be increased, and thus workability may be deteriorated. In addition, fastening an oil drain plug at a correct position requires visual inspection by a skilled operator.

Therefore, in recent years, research on easily fastening an oil drain plug to an automatic transmission has been continuously conducted.

RELATED ART DOCUMENTS

Patent Documents

Korean Patent No. 10-1839898
Korean Patent No. 10-1619107

SUMMARY OF THE DISCLOSURE

Therefore, the present disclosure has been made in view of the above problems, and it is an object of the present disclosure to provide an oil drain plug apparatus that is capable of being easily coupled to and separated from automobile components such as an automatic transmission and has excellent assembly performance and durability.

In accordance with one aspect of the present disclosure, provided is an oil drain plug apparatus, wherein the oil drain plug apparatus is mounted on an automobile component containing a fluid including oil, and the oil drain plug apparatus includes a mounting portion provided on the automobile component and having a fastening hole penetrating the mounting portion; a plug portion configured to be inserted into the fastening hole and mounted on the mounting portion; and a sealing portion for sealing a gap between the mounting portion and the plug portion, wherein the sealing portion is mounted on the mounting portion while being coupled to the plug portion, wherein the plug portion includes a plug configured to be inserted into the automobile component through the fastening hole when coupled to the mounting portion; and a cap extending from the plug so as to be exposed outside of the automobile component through the fastening hole when coupled to the mounting portion, and the plug portion is rotated after being inserted into the fastening hole, and is fixed to the mounting portion, wherein one or more interference blades configured to protrude from an outer circumferential surface of the cap and bend toward the plug are formed on the cap to limit a rotation angle of the plug portion relative to the mounting portion.

In addition, the mounting portion may include a first mounting protrusion formed concentrically around the fastening hole and configured to protrude toward outside of the automobile component, a second mounting protrusion formed concentrically around the fastening hole at a position spaced apart from the first mounting protrusion and configured to protrude toward outside of the automobile component, and interference grooves formed between the first and second mounting protrusions and configured to allow one or more interference blades to be inserted thereinto. In this case, the interference grooves may be provided with stoppers to interfere with rotation of the interference blades.

In addition, the interference blades may be inserted into the interference grooves to a depth that satisfies non-contact with bottom surfaces of the interference grooves. In this case, the depth may be less than an overall height of the interference blades and greater than half of the overall height of the interference blades.

In addition, when the plug portion is excessively assembled on the mounting portion, the interference blades may be pressurized against the stoppers and broken, and the plug portion having the broken interference blades may be separated from the mounting portion and replaced.

In addition, the plug may have a diameter corresponding to the fastening hole and may be inserted into the fastening hole, an outer circumferential surface of the plug may be provided with one or more insertion protrusions configured to protrude in a radial direction of the plug, and the fastening hole may be provided with one or more guide grooves extending in a radial direction so that the insertion protrusions are inserted into the guide grooves.

In addition, an inner surface of the automobile component may be provided with guiders each having an inclined surface that is inclined toward inside of the automobile component along a rotational direction of the plug portion from the guide groove, and the insertion protrusions may be guided along the inclined surfaces in association with rotation of the plug portion inserted into the fastening hole.

In addition, the interference blades may be rotated along interference grooves provided in the mounting portion, stoppers may be formed on the interference grooves in a protruding form to interfere with rotational force by contacting the interference blades, and when the plug portion is excessively assembled on the mounting portion, as the insertion protrusions enter inside of the automobile component along the inclined surfaces, the interference blades may be broken due to pressure applied to the interference blades and pressure caused by collision with the stoppers.

In addition, the cap may include a first cap protrusion formed concentrically around the plug on a surface facing the mounting portion, a second cap protrusion formed concentrically around the plug on a surface facing the mounting portion and disposed at a position spaced apart from the first cap protrusion, and a sealing groove formed between the first and second cap protrusions and configured to allow the sealing portion to be inserted thereinto.

In addition, the first and second cap protrusions may include one or more first sealing jaws and one or more second sealing jaws that are configured to protrude toward the sealing groove to interfere with the sealing portion.

In addition, a tool insertion groove through which a tool is inserted to apply rotational force may be formed at a center of the cap.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Hereinafter, preferred embodiments of the present disclosure will be described with reference to the accompanying drawings. However, the spirit of the present disclosure is not limited to the embodiments, and the spirit of the present disclosure may be proposed differently by adding, changing, and deleting the elements constituting the embodiments, which is also within the spirit of the present disclosure.

Figure 1:
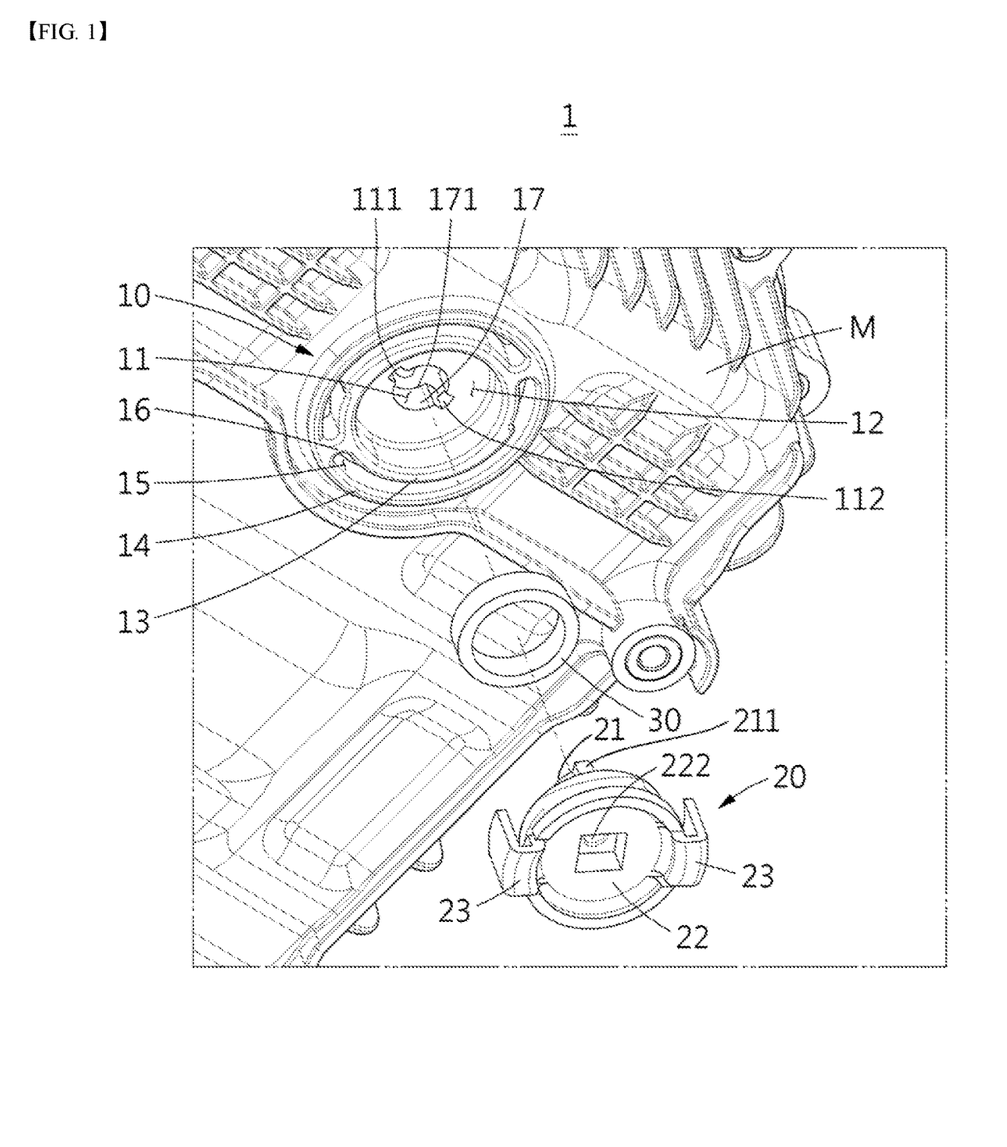
FIG. 1 is an exploded perspective view of an oil drain plug apparatus according to a preferred embodiment of the present disclosure.

Referring to FIG. 1, an oil drain plug apparatus 1 according to a preferred embodiment of the present disclosure includes a mounting portion 10, a plug portion 20, and a sealing portion 30.

In addition, the oil drain plug apparatus 1 described in the present disclosure is exemplified as being mounted on an automatic transmission M of an automobile to maintain transmission oil circulating in the automatic transmission M at an appropriate level, but the present disclose is not limited thereto. That is, in addition to the automatic transmission M of an automobile, the oil drain plug apparatus 1 may be mounted on a predetermined automobile component, such as an engine or a cooler, to which a fluid such as oil is applied, and may serve to maintain the level of the fluid.

The mounting portion 10 is provided on the automatic transmission M, and has a fastening hole 11 penetrating therethrough. As shown in FIG. 1, the fastening hole 11 may be formed through a cover plate surrounding and supporting the automatic transmission M, and is formed in an approximately circular shape.

Figure 2:
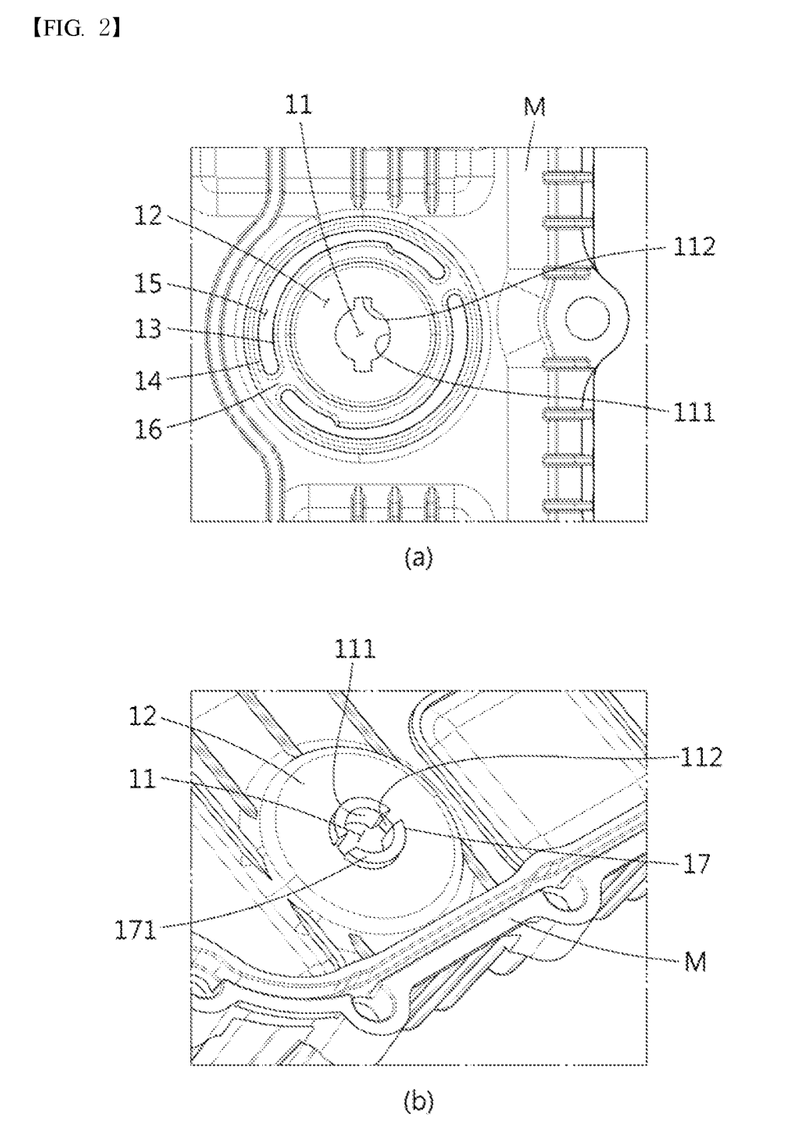
FIG. 2 schematically illustrates the mounting portion of the oil drain plug apparatus shown in FIG. 1.

Referring to (a) and (b) of FIG. 2, the mounting portion 10 has a mounting area 12 stepped toward the inside of the automatic transmission M around the fastening hole 11. By mounting and seating the plug portion 20 to be described later on the mounting area 12, the plug portion 20 may be stably coupled to the automatic transmission M. In addition, since the mounting area 12 is formed to be stepped toward the inside of the automatic transmission M, the height of the plug portion 20 protruding from the automatic transmission M may be reduced, thereby improving aesthetics.

In addition, as shown in (a) of FIG. 2, the mounting portion 10 has a first mounting protrusion 13 and a second mounting protrusion 14 each formed in a ring shape so as to be spaced apart from each other around the fastening hole 11 and protrude outward of the automatic transmission M. In this case, the first and second mounting protrusions 13 and 14 are arranged so that a separation distance from the fastening hole 11 to the second mounting protrusion 14 is greater than a separation distance from the fastening hole 11 to the first mounting protrusion 13. With this arrangement, the fastening hole 11 is surrounded by the first mounting protrusion 13, and the first mounting protrusion 13 is surrounded by the second mounting protrusion 14.

In addition, the mounting area 12 between the fastening hole 11 and the first mounting protrusion 13 may be formed to have a flat bottom.

In addition, the mounting portion 10 has interference grooves 15 into which interference blades 23 to be described later are inserted. In this case, the interference grooves 15 are formed between the first and second mounting protrusions 13 and 14 so as to be concave toward the inside of the automatic transmission M. One or more stoppers 16 for limiting the radius of rotation of the plug portion 20 to be described later are provided on the interference grooves 15. The stoppers 16 are formed to protrude from the interference grooves 15 and interconnect the first and second mounting protrusions 13 and 14.

Figure 4:
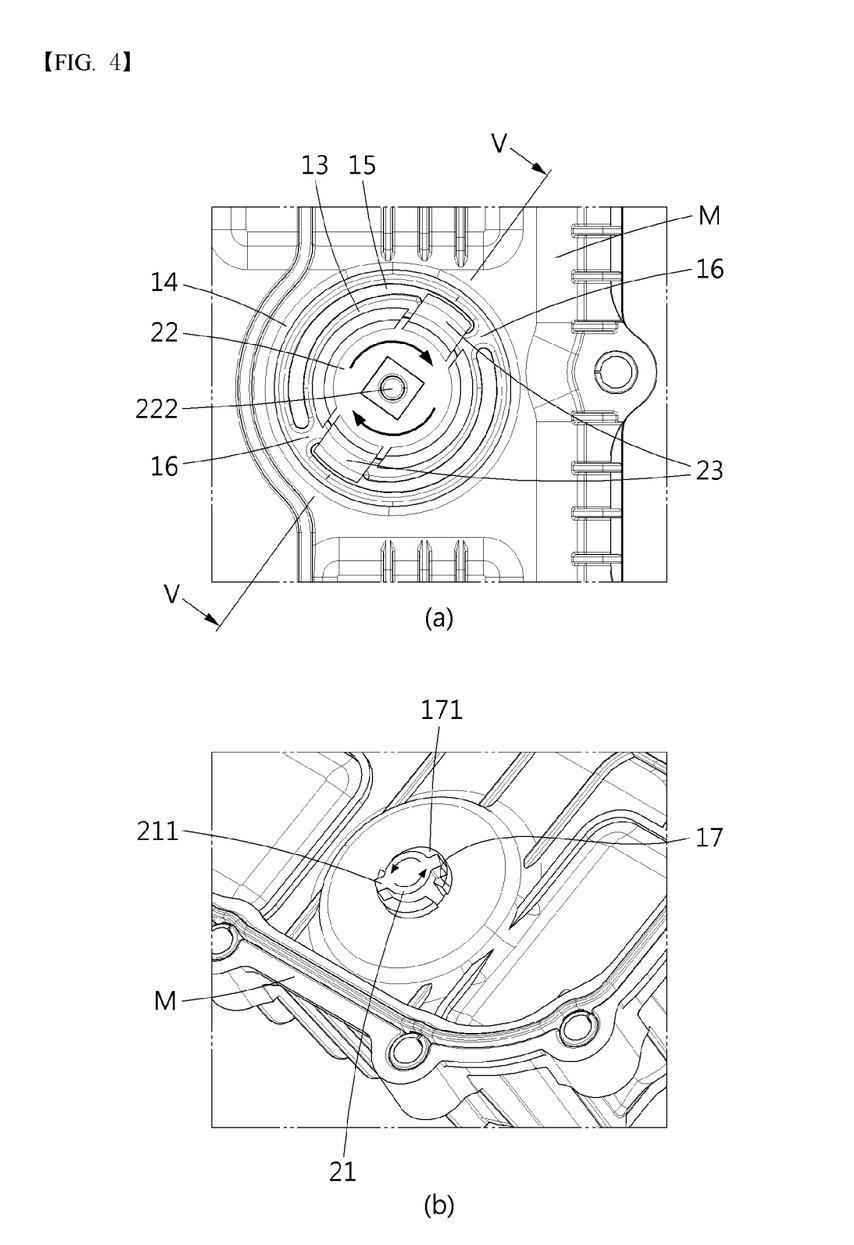
FIG. 4 schematically illustrates a state wherein an oil drain plug apparatus is coupled to an automatic transmission.
Figure 5:
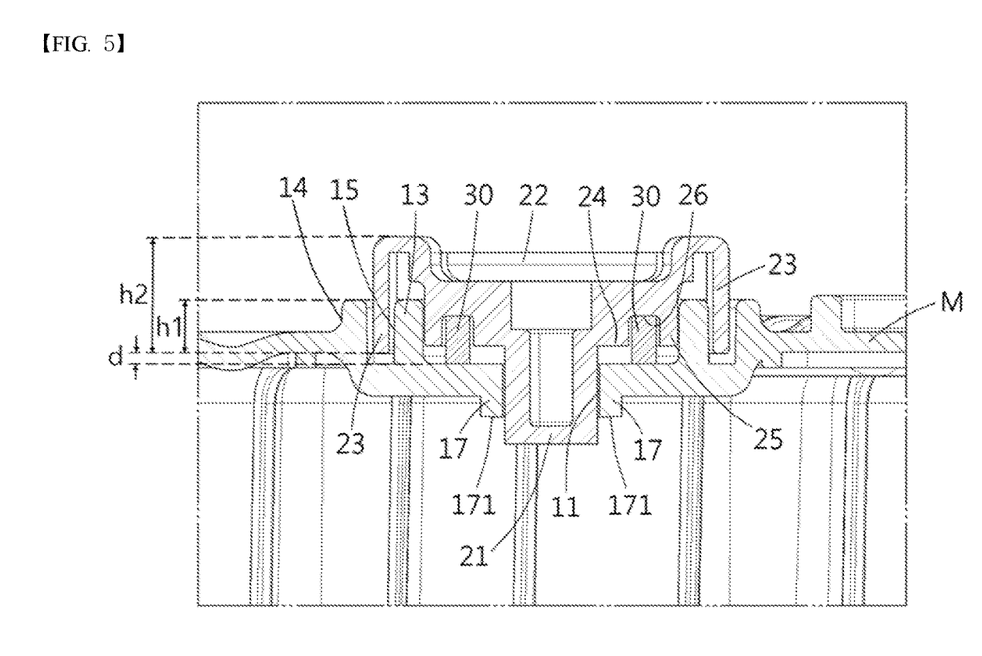
FIG. 5 is a cross-sectional view taken along line V-V shown in FIG. 4.

In addition, as shown in FIGS. 4 and 5, an operation in which interference occurs when inserting the interference blades 23 of the plug portion 20 into the interference grooves 15 and the configuration of the plug portion 20 will be described later in detail.

Figure 3:
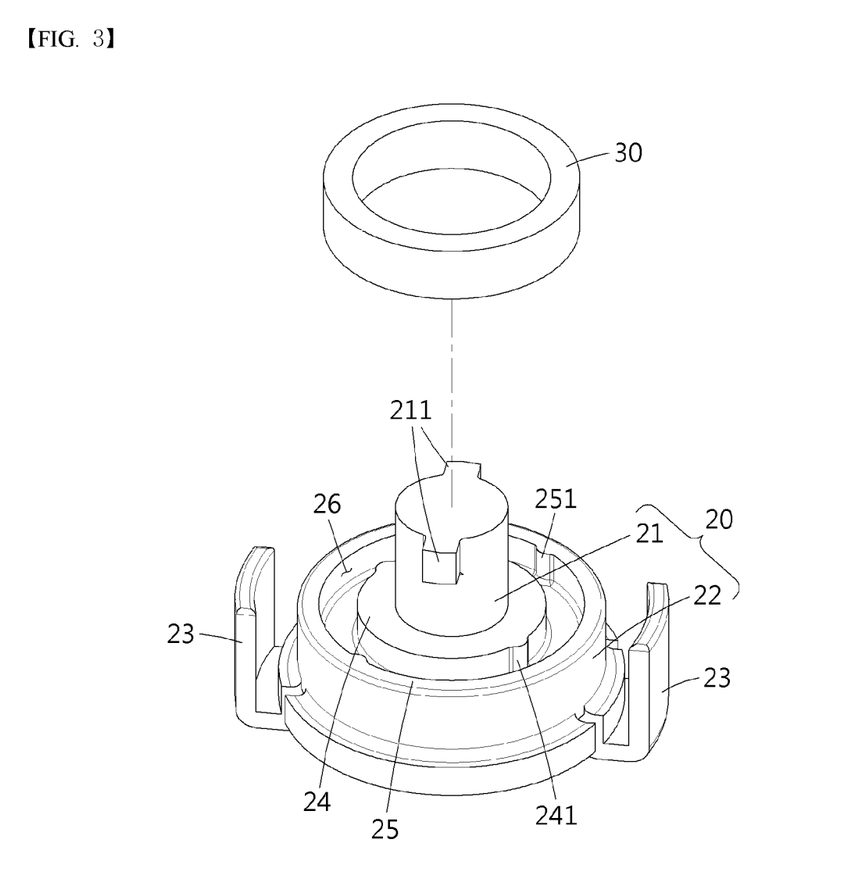
FIG. 3 schematically illustrates the plug portion of the oil drain plug apparatus shown in FIG. 1.

The plug portion 20 is coupled to the fastening hole 11 of the mounting portion 10 and is mounted on the mounting area 12. As shown in FIG. 3, the plug portion 20 has a plug 21 and a cap 22, and may be formed by injection-molding a fiber-reinforced synthetic resin.

When the plug 21 is coupled to the mounting portion 10, the plug 21 is inserted into the automatic transmission M through the fastening hole 11. In this embodiment, the plug 21 has a protruding cylindrical shape having a diameter corresponding to the diameter of the fastening hole 11.

In addition, one or more insertion protrusions 211 protruding in a radial direction from the outer circumferential surface of the plug 21 are formed at the insertion end of the plug 21 inserted into the fastening hole 11. In this embodiment, a pair of insertion protrusions 211 is configured to protrude from the outer circumferential surface of the plug 21 so as to face each other in a radial direction at the insertion end of the plug 21. However, the present disclosure is not limited thereto, and various modifications are possible. For example, at the outer circumferential surface of the insertion end of the plug 21, one insertion protrusion 211 may be formed, or three or more insertion protrusions 211 may be formed to be spaced apart from each other.

In addition, as shown in (a) of FIG. 2, semicircular locking jaws 111 are formed on both sides of the inner wall of the circular fastening hole 11, respectively, and one or more guide grooves 112 are formed between the semicircular locking jaws 111 so that the insertion protrusions 211 protruding from the plug 21 are inserted into the guide grooves 112. In this case, the guide grooves 112 are formed to extend in a radial direction of the fastening hole 11 and have a size corresponding to the insertion protrusions 211.

With this configuration, when the plug 21 is inserted into the fastening hole 11 and the insertion protrusions 211 are inserted into the guide grooves 112, the plug 21 enters the inside of the automatic transmission M. When the plug 21 enters the inside of the automatic transmission M, and then the insertion protrusions 211 leave the guide grooves 112, the plug 21 is rotated within the fastening hole 11.

At this time, the insertion protrusions 211 are guided by guiders 17 each having an inclined surface 171 that is inclined toward the inside of the automatic transmission M from the guide groove 112 of the fastening hole 11 inside the automatic transmission M. Here, the guiders 17 are formed along the outer periphery of the fastening hole 11, and are configured so as to protrude and be inclined gradually toward the inside of the automatic transmission M as the guiders 17 move away from the guide grooves 112 along the rotational direction of the plug portion 20.

With this configuration, when the insertion protrusions 211 are inserted through the guide grooves 112 of the fastening hole 11 and then the plug 21 is rotated, the insertion protrusions 211 formed integrally with the plug 21 and protruding therefrom are guided along the inclined surfaces 171 of the guiders 17. After the plug 21 is rotated to a point at which the plug 21 stops rotating due to interference by the inclined surfaces 171 of the guiders 17, the plug 21 remains engaged in the fastening hole 11.

The cap 22 of the plug portion 20 is configured to extend from the plug 21 so as to be exposed to the outside of the automatic transmission M when the cap 22 is coupled to the mounting portion 10. The cap 22 has a larger diameter than the plug 21 so as to cover the mounting area 12 outside the automatic transmission M.

In addition, the cap 22 has one or more interference blades 23 for limiting the rotation angle of the plug 21 relative to the mounting portion 10. In this embodiment, as shown in FIG. 3, the cap 22 has a pair of interference blades 23 spaced apart from each other in a radial direction of the cap 22 and protruding from the cap 22, but the present disclosure is not limited thereto.

The interference blades 23 are configured to protrude from the cap 22 in a radial direction and be bent toward the plug 21. As shown in FIGS. 4 and 5, the bent ends of the interference blades 23 are inserted into the interference grooves 15 of the mounting portion 10. With this configuration, when the plug 21 is inserted into the fastening hole 11 and is rotated, the interference blades 23 are rotated along the interference grooves 15.

As shown in FIG. 5, the interference blades 23 are spaced apart from the bottom surfaces of the interference grooves 15 by a predetermined distance d, and thus are in a non-contact state with the mounting area 12 of the mounting portion 10. That is, when the interference blades 23 are inserted into the interference grooves 15, the length of the interference blades 23 entering toward the mounting portion 10 is shorter than that of the sealing portion 30 to be described later. In this case, since the interference blades 23 rotating within the interference grooves 15 do not contact the mounting area 12, friction does not occur during rotation, thereby improving durability.

As shown in FIG. 4, the interference blades 23 are rotated within the interference grooves 15 until the stoppers 16 interfere with the interference blades 23. Accordingly, the radius of rotation of the plug portion 20 may be limited. When the plug portion 20 is rotated exceeding a preset rotation angle, that is, when the plug portion 20 is excessively assembled, the interference blades 23 may be pressurized against the stoppers 16, such that the interference blades 23 may be broken.

More specifically, as shown in (a) of FIG. 4, the interference blades 23 are inserted into the interference grooves 15 and rotated. At the same time, as shown in (b) of FIG. 4, the insertion protrusions 211 of the plug 21 inserted through the fastening hole 11 leave the guide grooves 112, and are guided obliquely along the inclined surfaces 171 of the guiders 17. At this time, the insertion protrusions 211 gradually enter the inside of the automatic transmission M along the inclined surfaces 171, and the interference blades 23 protruding from the cap 22 integrally formed with the plug 21 also enter toward the mounting area 12 provided on the automatic transmission M.

Accordingly, reaction force due to close contact of the locking jaws 111 with the inclined surfaces 171 is applied to the interference blades 23, so that pressure toward the automatic transmission M is applied to the interference blades 23. In this way, when pressure toward the automatic transmission M is applied to the interference blades 23, and at the same time, pressure due to collision with the stoppers 16 due to excessive assembling is generated, the interference blades 23 may be relatively easily damaged.

In addition, as shown in FIG. 5, a depth h1 at which the interference blade 23 is inserted into the interference groove 15 as much as possible is less than an overall height h2 of the interference blade 23. More preferably, the interference blade 23 is inserted into the interference groove 15 at the depth h1 less than the overall height h2 of the interference blade 23 and greater than half of the overall height h2. In this case, the cross-sectional area of the interference blade 23 in contact with the stopper 16 when the interference blade 23 is inserted into the interference groove 15 and collides with the stopper 16 installed between the first and second mounting protrusions 13 and 14 is at least half of the overall cross-sectional area of the interference blade 23. Accordingly, even when the interference blades 23 collide with the stoppers 16 due to excessive assembling of the plug portion 20, the interference blades 23 may be broken without passing over the stoppers 16.

In this case, the stoppers 16 are not broken, and only the interference blades 23 to which pressure is applied in at least two directions due to excessive assembling of the plug portion 20 are broken. Thus, when the plug portion 20 is excessively assembled, compared to the mounting portion 10, there is an advantage in that only the plug portion 20, which is relatively easy to replace and inexpensive, is replaced. After the interference blades 23 are broken due to excessive assembling of the plug portion 20, the plug portion 20 may be separated from the mounting portion 10 by further rotating the plug portion 20 so that the insertion protrusions 211 are separated from the guide grooves 112.

In addition, when excessive assembling is performed, in order for the interference blades 23 protruding from the cap 22 to be pressurized against the stoppers 16 and broken, the stoppers 16 are preferably formed of a material having a greater rigidity than that of the interference blades 23. The conditions of the interference blades 23, such as material, thickness, and depth of insertion into the interference grooves 15, may be changed depending on the conditions of the stoppers 16.

In addition, on one surface of the cap 22 facing the mounting portion 10 provided on the automatic transmission M, a first cap protrusion 24 protruding to support the outer periphery of the plug 21 and a second cap protrusion 25 provided at a position spaced from the first cap protrusion 24 in a radial direction are provided. In addition, a sealing groove 26 is formed between the first and second cap protrusions 24 and 25 of the cap 22. In this case, the first and second cap protrusions 24 and 25 are formed as ring-shaped protrusions around the plug 21, and the sealing groove 26 is formed as a ring-shaped groove.

In addition, first and second sealing jaws 241 and 251 protruding toward the sealing groove 26 are provided on the first and second cap protrusions 24 and 25. In this case, the first and second sealing jaws 241 and 251 have a hemispherical shape and protrude toward the sealing groove 26. With this configuration, the first and second sealing jaws 241 and 251 interfere with the sealing portion 30 to be described later to prevent the sealing portion 30 inserted into the sealing groove 26 from flowing in the sealing groove 26.

In addition, as shown in FIG. 1, at the center of the cap 22, a tool insertion groove 222 through which a tool (not shown) is inserted to apply rotational force may be formed. The shape of the tool insertion groove 222 may be changed according to the inserted tool (not shown).

The sealing portion 30 is interposed in the plug portion 20 to seal a gap between the mounting portion 10 and the plug portion 20. The sealing portion 30 is formed in a ring shape so as to be interposed in the ring-shaped sealing groove 26 provided between the first and second cap protrusions 24 and 25 having a ring shape. In addition, the sealing portion 30 is formed of an elastic material such as rubber and is compressed between the mounting portion 10 and the plug portion 20. Accordingly, the sealing portion 30 is in close contact with the mounting area 12 to prevent oil circulating in the automatic transmission M from leaking through the fastening hole 11.

Coupling operation of the oil drain plug apparatus 1 according to the present disclosure having the above configuration is described with reference to FIGS. 1 to 5.

First, as shown in FIG. 1, the plug portion 20 is provided so as to correspond to the mounting portion 10 provided on the automatic transmission M. As shown in FIG. 3, the plug portion 20 is mounted on the mounting portion 10 shown in FIG. 2 with the sealing portion 30 inserted into the sealing groove 26.

As shown in (b) of FIG. 4, the plug 21 of the plug portion 20 is inserted through the fastening hole 11. In this case, the insertion protrusions 211 protruding in a radial direction from the insertion end of the plug 21 are inserted so as to correspond to the guide grooves 112 provided on the fastening hole 11. When the insertion protrusions 211 pass through the guide grooves 112 while the plug 21 is inserted into the fastening hole 11, rotation occurs in the arrow direction as shown in (a) and (b) of FIG. 4.

As the plug portion 20 is rotated while being inserted into the fastening hole 11, as shown in (b) of FIG. 4, the insertion protrusions 211 of the plug 21 move along the inclined surfaces 171 of the guiders 17 to enter the inside of the automatic transmission M. At the same time, as shown in (a) of FIG. 4, the interference blades 23 protruding from the cap 22 are rotated along the interference grooves 15 of the mounting portion 10. In this case, as shown in FIG. 5, since the interference blades 23 are rotated while being spaced apart from the bottom surfaces of the interference grooves 15 by the predetermined distance d, friction is not caused between the interference blades 23 and the interference grooves 15.

When the plug portion 20 is rotated, the stoppers 16 provided on the interference grooves 15 interfere with the interference blades 23, and rotation of the plug portion 20 is limited to a position where the insertion protrusions 211 of the plug 21 are no longer moved by the inclination angle of the inclined surfaces 171. In this case, the depth h1 at which the interference blade 23 is inserted into the interference groove 15 is less than the overall height h2 of the interference blade 23, but is equal to or greater than half of the overall height h2. Accordingly, when the interference blades 23 contact the stoppers 16, the interference blades 23 do not pass over the stoppers 16.

In addition, when the rotation limit of the plug 21 exceeds a preset limit, i.e., when the plug 21 is excessively assembled, the interference blades 23 may be broken by the stoppers 16. In this case, the stoppers 16 are not broken, and only the interference blades 23 are broken by pressure caused by reaction force between the inclined surfaces 171 and the locking jaws 111 and pressure caused by collision with the stoppers 16. Accordingly, when the plug portion 20 is excessively assembled, only the plug portion 20, which is relatively easy to replace and inexpensive compared to the mounting portion 10, may be replaced.

In addition, the oil drain plug apparatus 1 may be coupled to the automatic transmission M using an assembly process in which insertion into the fastening hole 11 is performed without a separate fastening means, such as nuts and bolts, and rotation is performed. Thus, assembly performance may be improved.

According to the present disclosure having the above-described configuration, first, in an automobile component including an automatic transmission, coupling and separation can be performed using an operation in which a plug portion is inserted into a fastening hole without a separate fastening means and is rotated, thereby improving workability.

Second, since the rotational range of a plug portion can be limited, defects caused by excessive assembling can be prevented, and precision assembly is possible, thereby improving durability.

Third, since skilled work ability is not required, accessibility for general users can be improved.

Fourth, when a plug portion is excessively assembled on a mounting portion, since interference blades provided on the plug portion are broken, a plug portion that is easy to replace is replaced. Thus, maintenance and repairability can be improved.

Although the present disclosure has been described above with reference to the embodiments of the present disclosure,

DESCRIPTION OF SYMBOLS

| | |
|---|---|
| 1: OIL DRAIN PLUG APPARATUS | 10: MOUNTING PORTION |
| 11: FASTENING HOLE | 12: MOUNTING AREA |
| 13: FIRST MOUNTING PROTRUSION | 14: SECOND MOUNTING PROTRUSION |
| 15: INTERFERENCE GROOVES | 16: STOPPERS |
| 17: GUIDERS | 20: PLUG PORTION |
| 21: PLUG | 211: INSERTION PROTRUSIONS |
| 22: CAP | 23: INTERFERENCE BLADES |
| 24: FIRST CAP PROTRUSION | 25: SECOND CAP PROTRUSION |
| 26: SEALING GROOVE | 30: SEALING PORTION |
| M: AUTOMATIC TRANSMISSION | |

What is claimed is:

1. An oil drain plug apparatus, wherein the oil drain plug apparatus is mounted on an automobile component containing a fluid comprising oil, and the oil drain plug apparatus comprises:
    a mounting portion provided on the automobile component and having a fastening hole penetrating the mounting portion;
    a plug portion configured to be inserted into the fastening hole and mounted on the mounting portion; and
    a sealing portion for sealing a gap between the mounting portion and the plug portion, wherein the sealing portion is mounted on the mounting portion while being coupled to the plug portion,
    wherein the plug portion comprises:
        a plug in a shape of a cylinder protruding in a first direction and configured to be inserted into the automobile component through the fastening hole when coupled to the mounting portion; and
        a cap extending from the plug so as to be exposed outside of the automobile component through the fastening hole when coupled to the mounting portion, and
    wherein the plug portion is rotated after being inserted into the fastening hole, and is fixed to the mounting portion,
    wherein the cap includes interference blades configured to protrude from an outer circumferential surface of the cap and bend toward the plug to limit a rotation angle of the plug portion relative to the mounting portion,
    wherein the mounting portion comprises:
        a first mounting protrusion formed concentrically around the fastening hole and protruding in a second direction toward outside of the automobile component, the second direction being opposite to the first direction,
        a second mounting protrusion formed concentrically around the fastening hole at a position spaced apart from the first mounting protrusion and protruding in the second direction toward outside of the automobile component, the first mounting protrusion being surrounded by the second mounting protrusion,
        interference grooves formed between the first mounting protrusion and the second mounting protrusion and configured to allow the interference blades of the cap to be inserted into the interference grooves, and
        stoppers provided between the interference grooves to interfere with rotation of the interference blades of the cap,
    wherein the plug has a diameter corresponding to the fastening hole and is inserted into the fastening hole,
    wherein the plug includes insertion protrusions protruding in a radial direction from an outer circumferential surface of the plug and formed at an insertion end of the plug, the radial direction being perpendicular to each of the first direction and the second direction,
    wherein the fastening hole is provided with guide grooves extending in the radial direction so that the insertion protrusions of the plug are inserted into the guide grooves,
    wherein the mounting portion further includes guiders formed along an outer periphery of the fastening hole and protruding toward the inside of the automatic component,
    wherein each of the guiders has an inclined surface which is gradually inclined along a rotational direction of the plug, and
    wherein when the insertion protrusions of the plug are inserted through the guide grooves of the fastening hole and the plug is rotated along the rotational direction of the plug, the insertion protrusions of the plug are guided along the inclined surfaces of the guiders so that the plug remains engaged in the fastening hole.

2. The oil drain plug apparatus according to claim 1, wherein the interference blades are inserted into the interference grooves to a depth that satisfies non-contact with bottom surfaces of the interference grooves, wherein the depth is less than an overall height of the interference blades and greater than half of the overall height of the interference blades.

3. The oil drain plug apparatus according to claim 1, wherein, when the plug portion is excessively assembled on the mounting portion, the interference blades are pressurized against the stoppers and broken, and the plug portion having the broken interference blades is separated from the mounting portion and replaced.

4. The oil drain plug apparatus according to claim 1, wherein the interference blades are rotated along the interference grooves provided in the mounting portion,
    wherein the stoppers are formed on the interference grooves in a protruding form to interfere with rotational force by contacting the interference blades, and
    when the plug portion is excessively assembled on the mounting portion, as the insertion protrusions enter inside of the automobile component along the inclined surfaces, the interference blades are broken due to pressure applied to the interference blades and pressure caused by collision with the stoppers.

5. The oil drain plug apparatus according to claim 1, wherein the cap comprises a first cap protrusion formed concentrically around the plug on a surface facing the mounting portion;
    a second cap protrusion formed concentrically around the plug on a surface facing the mounting portion and disposed at a position spaced apart from the first cap protrusion; and
    a sealing groove formed between the first and second cap protrusions and configured to allow the sealing portion to be inserted thereinto.

6. The oil drain plug apparatus according to claim 5, wherein the first and second cap protrusions comprise one or more first sealing jaws and one or more second sealing jaws that are configured to protrude toward the sealing groove to interfere with the sealing portion.

7. The oil drain plug apparatus according to claim 1, wherein a tool insertion groove through which a tool is inserted to apply rotational force is formed at a center of the cap.

8. The oil drain plug apparatus according to claim 1, wherein the plug is in a shape of a non-threaded cylinder protruding in the first direction.

* * * * *